May 27, 1958   S. E. FARMER   2,836,443
PRESSURE OPERATED SEALING MEANS FOR HYDRAULIC ACTUATORS
Filed Dec. 3, 1954
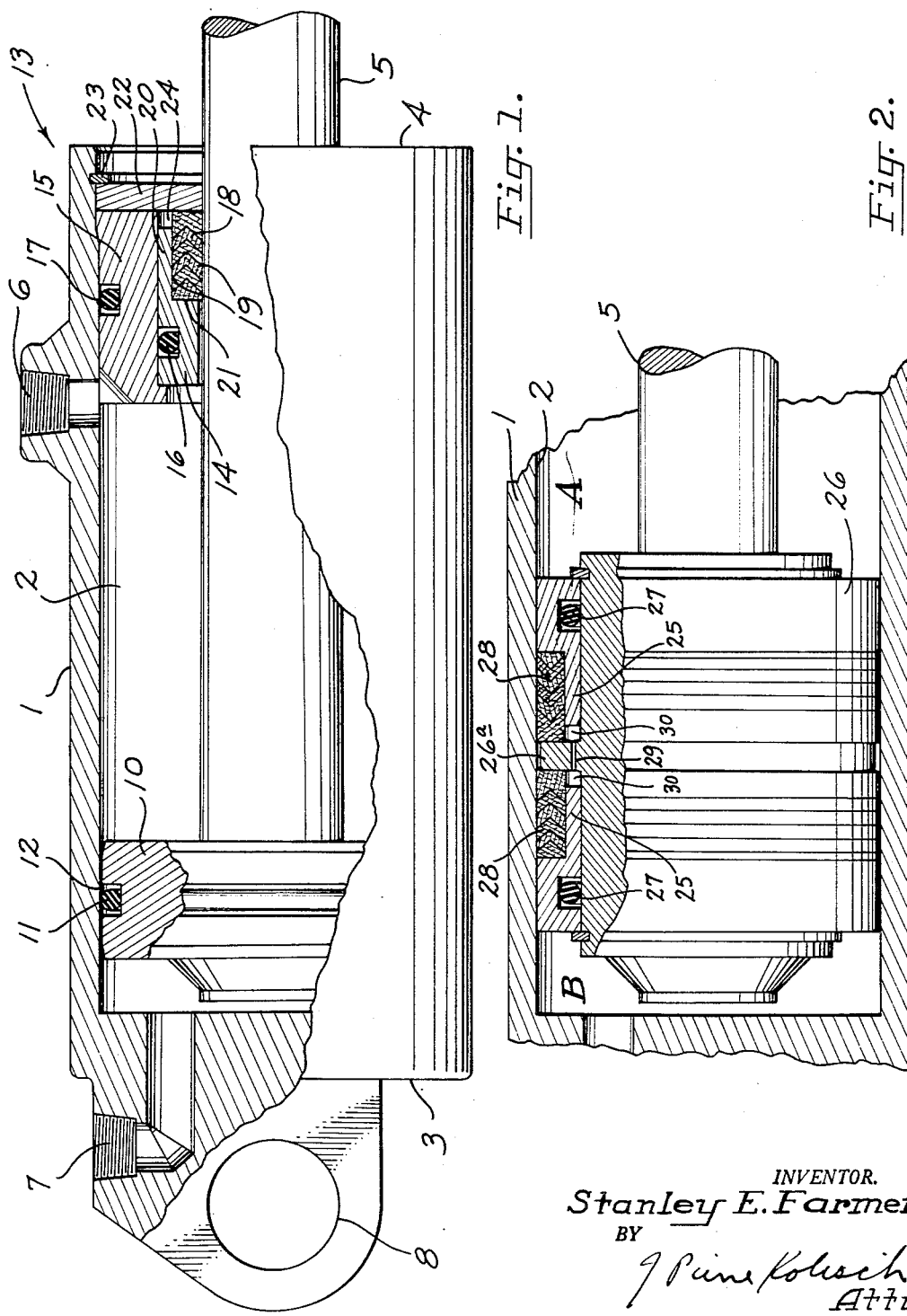
INVENTOR.
Stanley E. Farmer
BY
J. Pine Kolisch
Atty.

United States Patent Office 2,836,443
Patented May 27, 1958

2,836,443

PRESSURE OPERATED SEALING MEANS FOR HYDRAULIC ACTUATORS

Stanley E. Farmer, Portland, Oreg., assignor to Cascade Manufacturing Company, Portland, Oreg., a corporation of Oregon Application December 3, 1954, Serial No. 472,992

6 Claims. (Cl. 286—26)

This invention relates generally to sealing means for hydraulic actuators and more specifically to pressure operated members for use in conjunction with actuators to produce a self-adjusting tight seal.

In the construction of hydraulic cylinders the provision of means for preventing fluid under pressure from leaking from the cylinder has been a continuing problem. Many different general solutions to the problem have been proposed, and the present invention relates to an improvement in one of these solutions, e. g. the use of a pressure actuated sliding member to compress packing material during operation of the cylinder.

According to the present invention there is no metal to metal seal relied upon for preventing the fluid from leaking. Conventional O ring seals are employed at all points where they may be efficiently used; however, at those points which may be subjected to increased pressures or where O rings are unsuitable for some other reasons a stack of packing material and a pressure actuated bushing for compressing the material are provided.

The invention resides in the combination and coaction of elements which will be better understood from the detailed description which follows when read in conjunction with the drawings in which:

Fig. 1 is a side elevation partly in section of the invention; and

Fig. 2 is a side elevation partly in section of an alternative construction for the piston head of Fig. 1.

Referring to the drawings, 1 is the tubular shell of a double acting hydraulic cylinder having a chamber 2. The shell has a closed end 3 and an end 4 having an opening through which piston rod 5, which is of smaller diameter than the bore of the shell, extends. Ports 6 and 7 extend through the shell and connect to the chamber 2 whereby fluid under pressure may be admitted and exhausted from the chamber. An attaching eye 8 is provided at the closed end of the shell for mounting of the cylinder.

A piston head 10 is welded or otherwise suitably fastened near the end of rod 5 which is adjacent the closed end of the shell. Head 10 is in slidable engagement with the inside surface of shell 1 which is preferably made from polished steel and the outside surface of the piston head and rod 5 are chrome plated steel. Means for sealing the piston head to the shell are provided, preferably in the form of an O ring 11 in a recess 12 of head 10.

At end 4 of the shell a stuffing box assembly generally indicated at 13 is provided for sealing the rod to the shell. A longitudinally slidable bushing 14 is mounted around rod 5. It is sealed to a retaining member 15 by O ring 16. Another O ring 17 seals retainer 15 to shell 1. A stack of packing material, preferably a plurality of chevron rings 18, surround rod 5 and feather edges 19 of the packing rings engage the surface of the rod. Feather edges 19 also engage the surface of projection 20 extending from bushing 14. A shoulder 21 on bushing 14 abuts against one end of stack 18 and the other end of stack 18 engages a washer 22 which extends between the shell and the rod. It will be noted that projection 20 and shoulder 21 of the bushing define an annular shelf in which stack 18 is confined and held in place against the cylindrical surface of the piston rod. The washer is held in place by a snap ring 23 in shell 1. It will be noted that a small chamber or space 24 is provided between the end of projection 20 and washer 22. This space permits longitudinal movement of bushing 14 to compress packing 18. The chevron type packing material is preferred where the surface with which it must maintain sealing engagement may become burred, nicked or otherwise irregular. This is particularly true for the portions of piston rods like 5 which in operation are exposed.

When pressure is introduced through port 6 into the chamber, the bushing tends to move longitudinally to the right. The pressure reacts against the outer diameters of O ring 16 and feather edges 19 of the packing. This effective pressure area is equal to the area of projection 20 and tends to move the bushing. When the bushing moves, its shoulder 21 applies pressure against the stack of chevron rings and causes their feather edges to lie firmly against the surfaces which they contact, i. e. rod 5 and projection 20. As the chevron rings become worn from continued use, there is a gradual diminution in the stack height of packing rings 18. In order to compensate for this and to provide for a maximum sealing engagement throughout the useful life of the packing material, space 24 is provided between the end of sliding bushing 14 and stop washer 22 so that the bushing may move to the right and continue abutting the stack and apply pressure against the packing rings. It will be noted that after the cylinder has been used rod 5 will become worn or damaged, nevertheless the effectiveness of the stuffing box seal will not be impaired as the sliding bushing and seals cooperating therewith are not exposed to damage.

Fig. 2 shows an alternative construction for sealing the piston head to the shell of the cylinder. The construction shown may be advantageously used in double acting cylinders which are subjected to relatively high pressures, upward of about 1400 lbs. p. s. i. and where the surface finish and the manufacturing tolerances do not permit the use of O ring seals. According to this embodiment of the invention the piston head is sealed to the shell by a sealing construction similar to that employed in the stuffing box shown in Fig. 1. A pair of slidable bushings 25 are mounted on head 26 of piston rod 5 in linear alignment and separated from each other by spacer 26a. Bushings 25 are sealed to head 26 by O rings 27 and to the inside of shell 1 by stacks of chevron packing rings 28. A small port 29 interconnects chambers 30 provided at the ends of bushings 25 so that any of the pressure fluid which might have leaked past the packing will be evacuated from the chamber when one of the bushings is subjected to pressure. It will be understood that in double acting cylinders of this typpe when side A of chamber 2 is high pressure, side B will be low pressure and vice versa.

In the case of a single acting cylinder the sealing means shown in Fig. 2 may be employed except that instead of a pair of sealing means, only one is necessary, and the seals and sliding bushing shown at the right in Fig. 2 may be eliminated.

It will be appreciated that, according to the invention, an automatic self-adjusting means is provided for preloading the packaging material for subjecting it to the correct amount of pressure to prevent leakage of the cylinder during operation thereof. In this manner all guesswork and estimation of the degree of tightness to which the packing material should be subjected is eliminated while

I claim:

1. In a hollow cylinder comprising a shell and piston rod and head combination and involving the movement of one cylindrical surface relative to another, said cylindrical surfaces being substantially concentric, an improved sealing structure between said cylindrical surfaces comprising in combination a longitudinally slidable sleeve bushing surrounding snugly one of said cylindrical surfaces, said sleeve bushing being so constructed that one end portion has a thicker wall than its remaining portion, said remaining portion of smaller wall thickness being co-extensive with a side of said thicker portion and forming with said thicker portion an annular shelf, a body of compressible non-fluid packing material carried in and filling said shelf and having an end portion projecting outwardly from said shelf beyond the edge of said remaining portion in one longitudinal direction, said packing material being held in sealing engagement against one of said cylindrical surfaces, the other of said cylindrical surfaces being in sealing engagement with the thicker portion of the bushing, means associated with the bushing to restrain the movement of said bushing in the other longitudinal direction, the bushing being free to move in said one longitudinal direction, and means associated with the confined packing material to restrain its movement in said one longitudinal direction, whereby when fluid pressure is applied to said hollow cylinder, the sleeve bushing is caused to move against the restrained packing material in said one direction, thereby pressing the packing material up against the cylindrical surface in contact therewith, said sleeve bushing sliding over said end portion of said packing material upon a diminution in size of said packing material under compression.

2. The improved sealing structure as defined in claim 1, wherein the packing material comprises chevron rings.

3. The improved sealing structure as defined in claim 1, wherein the cylindrical surfaces being sealed comprise the shell of the hollow cylinder on one side and the cylindrical surface of the piston rod on the other, said sealing structure therebetween including a stuffing box comprising an annular retainer member adjacent the shell and means for sealing in fluid-tight relationship the retainer to the shell with the bushing adjacent and sealed in fluid-tight relationship to the retainer, said bushing surrounding snugly the surface of the piston rod, the packing material confined by the annular shelf being held in sealing engagement with the surface of said piston rod.

4. The improved sealing structure as defined in claim 3, wherein the means for restraining the movement of the bushing in one direction is a projection extending from the retainer member which abuts against the thick-end portion of the bushing and wherein the means for restraining movement of the packing material in the other direction comprises a washer held up against the material by a snap ring, said snap ring being secured in place on said shell.

5. The improved sealing structure as defined in claim 1, wherein the cylindrical surfaces being sealed comprise the shell of the hollow cylinder on one side and the cylindrical surface of the piston head on the other, said sealing structure therebetween comprising said bushing surrounding snugly the surface of said piston head, the packing material confined by the annular shelf of said bushing being held in sealing engagement against the shell of the cylinder, the bushing having sealing means between it and the piston head.

6. The improved sealing structure of claim 5, wherein the means for restraining the movement of the bushing in one direction and the means for restraining the movement of the packing material in the other are associated with the piston head.

References Cited in the file of this patent

UNITED STATES PATENTS

| Number | Name | Date |
|---|---|---|
| 512,551 | Kelly | Jan. 9, 1894 |
| 517,509 | Williams | Apr. 3, 1894 |
| 891,519 | Ambrose | June 23, 1908 |
| 1,324,775 | Anathor-Henriken | Dec. 16, 1919 |
| 1,523,986 | Schmidt | Jan. 20, 1925 |
| 1,686,090 | MacClatchie | Oct. 2, 1928 |
| 1,974,362 | Marsh | Sept. 18, 1934 |
| 2,343,511 | Lobanoff | Mar. 7, 1944 |
| 2,401,379 | Smith | June 4, 1946 |
| 2,518,097 | Thornhill | Aug. 8, 1950 |
| 2,533,531 | Stephens | Dec. 12, 1950 |
| 2,552,391 | Baldwin | May 8, 1951 |
| 2,567,527 | Parks | Sept. 11, 1951 |
| 2,628,112 | Hebard | Feb. 10, 1953 |
| 2,661,721 | Sherwen | Dec. 8, 1953 |
| 2,667,348 | Frye et al. | Jan. 26, 1954 |
| 2,670,973 | Ginther et al. | Mar. 2, 1954 |